United States Patent
Matsubara

(10) Patent No.: US 10,282,239 B2
(45) Date of Patent: *May 7, 2019

(54) MONITORING METHOD

(71) Applicant: NEC CORPORATION, Tokyo (JP)

(72) Inventor: Keisuke Matsubara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

This patent is subject to a terminal disclaimer.

(21) Appl. No.: 15/267,716

(22) Filed: Sep. 16, 2016

(65) Prior Publication Data

US 2017/0004026 A1    Jan. 5, 2017

Related U.S. Application Data

(63) Continuation of application No. 14/593,194, filed on Jan. 9, 2015, now Pat. No. 9,471,779.

(30) Foreign Application Priority Data

Jan. 10, 2014    (JP) ................................ 2014-003226

(51) Int. Cl.
*G06F 9/54*     (2006.01)
*G06F 11/30*    (2006.01)
(Continued)

(52) U.S. Cl.
CPC ............ *G06F 9/542* (2013.01); *G06F 11/302* (2013.01); *G06F 11/3409* (2013.01); *G06F 21/554* (2013.01)

(58) Field of Classification Search
CPC .... G06F 21/554; G06F 9/542; G06F 11/3409; G06F 11/302

(Continued)

(56) References Cited

U.S. PATENT DOCUMENTS 7,565,425 B2    7/2009  Van Vleet
7,895,325 B2    2/2011  Van Vleet
(Continued)

FOREIGN PATENT DOCUMENTS

JP    2007526537 A    9/2007
JP    2009020812 A    1/2009
(Continued)

OTHER PUBLICATIONS

Japanese Official Action dated Dec. 5, 2017; Application No. 2014-003226.

(Continued)

*Primary Examiner* — Kambiz Zand
*Assistant Examiner* — Aubrey H Wyszynski
(74) *Attorney, Agent, or Firm* — Young & Thompson

(57) ABSTRACT

An information processing system in which a monitoring device can detect illegal and/or abnormal operations in a system to be monitored, without using detailed information of the system, is provided. In a target device 100, an operation data generation unit 130 generates operation data 140 as data of encoding a set of operations related to a predetermined program executed in an execution environment 120, and transmits the operation data to the monitoring device 200. In the monitoring device 200, an operation pattern storing unit 230 stores an operation pattern 240 as operation data related to a set of operations to be detected. An operation data decision unit 220 decides that the operation to be detected is executed in the execution unit when the operation data received from the target device 100 matches the operation pattern 240, and notifies of execution of the operation to be detected.

30 Claims, 12 Drawing Sheets

(51) Int. Cl.
*G06F 11/34* (2006.01)
*G06F 21/55* (2013.01)

(58) Field of Classification Search
USPC .......................................................... 726/22
See application file for complete search history.

(56) References Cited

U.S. PATENT DOCUMENTS

| | | | |
|---|---|---|---|
| 7,945,637 B2 | 5/2011 | Van Vleet | |
| 8,326,819 B2 | 12/2012 | Indeck | |
| 8,489,388 B2 | 7/2013 | Bonnet | |
| 9,471,779 B2 * | 10/2016 | Matsubara | G06F 21/554 |
| 2004/0120582 A1 | 6/2004 | Sarkar | |
| 2007/0180516 A1 | 8/2007 | Aoki | |
| 2007/0260602 A1 | 11/2007 | Taylor | |
| 2010/0098338 A1 | 4/2010 | Kido | |
| 2011/0179488 A1 | 7/2011 | Mankins | |
| 2014/0281246 A1 * | 9/2014 | Breternitz, Jr. | G06F 12/0875 711/125 |
| 2014/0365524 A1 * | 12/2014 | Hirzel | G06F 17/30539 707/776 |

FOREIGN PATENT DOCUMENTS

| | | |
|---|---|---|
| JP | 2010-108469 | 5/2010 |
| JP | 2010266952 A | 11/2010 |
| WO | 2005048119 A1 | 5/2005 |

OTHER PUBLICATIONS

Japanese Office Action dated Feb. 13, 2018 in corresponding Japanese Patent Application No. 2014-003226 with JPO machine translation of Japanese Office Action.

* cited by examiner

Fig. 5

133 USER ATTRIBUTE DEFINITION

| AUTHORITY LEVEL | OPERATION GROUP 142 | | | |
|---|---|---|---|---|
| | 9 | 10 | 11 | 12 |
| 1 | 1 | 0 | 0 | 0 |
| 2 | 0 | 1 | 0 | 0 |
| 3 | 0 | 0 | 1 | 0 |
| : | : | : | : | : |

Fig. 6

| FUNCTION NAME | BIT POSITION | OPERATION BIT STRING | | | | | | | |
|---|---|---|---|---|---|---|---|---|---|
| | | 1 | 2 | 3 | 4 | 5 | 6 | 7 | 8 |
| CUSTOMER DATA. LIST-RETRIEVE () | 2 | 0 | 1 | 0 | 0 | 0 | 0 | 0 | 0 |
| PRINT SCREEN () | 4 | 0 | 0 | 0 | 1 | 0 | 0 | 0 | 0 |
| OPERATION GROUP | | 0 | 1 | 0 | 1 | 0 | 0 | 0 | 0 |

| FUNCTION NAME | BIT POSITION | OPERATION BIT STRING | | | | | | | |
|---|---|---|---|---|---|---|---|---|---|
| | | 1 | 2 | 3 | 4 | 5 | 6 | 7 | 8 |
| LOGIN | 3 | 0 | 0 | 1 | 0 | 0 | 0 | 0 | 0 |
| CUSTOMER DATA. CREATE NEW () | 7 | 0 | 0 | 0 | 0 | 0 | 0 | 1 | 0 |
| CUTOMER DATA. RETRIEVE () | 8 | 0 | 0 | 0 | 0 | 0 | 0 | 0 | 1 |
| CUSTOMER DATA. CORRECT () | 1 | 1 | 0 | 0 | 0 | 0 | 0 | 0 | 0 |
| CUSTOMER DATA. LIST-RETRIEVE () | 2 | 0 | 1 | 0 | 0 | 0 | 0 | 0 | 0 |
| PRINT SCREEN () | 4 | 0 | 0 | 0 | 1 | 0 | 0 | 0 | 0 |
| LOGOUT | 5 | 0 | 0 | 0 | 0 | 1 | 0 | 0 | 0 |
| OPERATION GROUP | | 1 | 1 | 1 | 1 | 1 | 0 | 1 | 1 |

| FUNCTION NAME | BIT POSITION | OPERATION BIT STRING | | | | | | | |
|---|---|---|---|---|---|---|---|---|---|
| | | 1 | 2 | 3 | 4 | 5 | 6 | 7 | 8 |
| CUSTOMER DATA. LIST-RETRIEVE () | 2 | 0 | 1 | 0 | 0 | 0 | 0 | 0 | 0 |
| ACCEPTED ORDER DATA. LIST-RETRIEVE () | 6 | 0 | 0 | 0 | 0 | 0 | 1 | 0 | 0 |
| PRINT SCREEN () | 4 | 0 | 1 | 0 | 1 | 0 | 0 | 0 | 0 |
| OPERATION GROUP | | 0 | 0 | 0 | 1 | 0 | 1 | 0 | 0 |

142

MONITORING METHOD

TECHNICAL FIELD

The present invention relates to an information processing system for monitoring a target device, an information processing device thereof, a monitoring device thereof, a monitoring method therefor, and a program therefor.

BACKGROUND ART

An information system is an important infrastructure which supports social infrastructures and corporate activities. A degree of importance of risk management for the information system has increased. Under such a circumstance, importance of a system audit for the information system has increased. In the system audit, for example, collection and analysis of operation information and the like in the information system are sometimes requested as corroboration of proper data management in the information system.

Technologies relating to collection and analysis of such operation information are described in, for example, the Japanese Patent Application Laid-Open No. 2010-108469, and a document entitled "IBM InfoSphere Guardium Data Security", International Business Machine Corporation, [online], [searched on Nov. 8, 2013], Internet<URL:http://www-01.ibm.com/software/data/guardium/>.

According to a technology described in the Japanese Patent Application Laid-Open No. 2010-108469, a monitoring system collects operation logs on each of computers which serve as a plurality of monitoring targets. Then, the monitoring system compares contents of operation information among the computers. Thus, the monitoring system decides, as peculiar operation information, operation information differing from the operation information collected on other computers.

According to a technology described in the document entitled "IBM InfoSphere Guardium Data Security", an agent operating at a kernel level on a server to be monitored captures all communication packets generated on the server and transmits the captured packets to a sniffer. The sniffer analyzes the received packets, performs information analysis and accumulation, and takes actions.

SUMMARY

An exemplary object of the present invention is to provide an information processing system in which a monitoring device can detect illegal and/or abnormal operations in a system to be monitored, without using detailed information of the system, an information processing device thereof, a monitoring device thereof, a monitoring method therefor, and a program therefor.

An information processing system according to an exemplary aspect of the invention includes: a first device including an operation data generation unit which generates operation data as data of encoding a set of operations related to a predetermined program executed in an execution unit, and transmits the operation data to a second device; and the second device including an operation pattern storing unit which stores an operation pattern as operation data related to a set of operations to be detected, and an operation data decision unit which decides that the operation to be detected is executed in the execution unit when the operation data received from the first device matches the operation pattern, and notifies of execution of the operation to be detected.

An information processing device according to an exemplary aspect of the invention includes an operation data generation unit which generates operation data as data of encoding a set of operations related to a predetermined program executed in an execution unit, and transmits the operation data to a monitoring device, wherein the monitoring device decides that an operation to be detected is executed in the execution unit when the operation data matches an operation pattern as operation data related to a set of operations to be detected, and notifies of execution of the operation to be detected.

A monitoring device according to an exemplary aspect of the invention includes: an operation pattern storing unit which stores an operation pattern as operation data related to a set of operations to be detected, the operation data being data of encoding a set of operations related to a predetermined program executed in an execution unit; and an operation data decision unit which decides that the operation to be detected is executed in the execution unit when the operation data received from the information processing device generating the operation data matches the operation pattern, and notifies of execution of the operation to be detected.

A monitoring method according to an exemplary aspect of the invention includes: generating operation data as data of encoding a set of operations related to a predetermined program executed in an execution unit, and transmitting the operation data to a second device, in a first device; storing an operation pattern as operation data related to a set of operations to be detected, in a second device; and deciding that the operation to be detected is executed in the execution unit when the operation data received from the first device matches the operation pattern, and notifying of execution of the operation to be detected, in the second device.

A first non-transitory computer readable storage medium recording thereon a program, according to an exemplary aspect of the invention causes a computer to perform a method including: generating operation data as data of encoding a set of operations related to a predetermined program executed in an execution unit, and transmitting the operation data to a monitoring device, wherein the monitoring device decides that an operation to be detected is executed in the execution unit when the operation data matches an operation pattern as operation data related to a set of operations to be detected, and notifies of execution of the operation to be detected.

A second non-transitory computer readable storage medium recording thereon a program, according to an exemplary aspect of the invention causes a computer to perform a method including: storing an operation pattern as operation data related to a set of operations to be detected, the operation data being data of encoding a set of operations related to a predetermined program executed in an execution unit; and deciding that the operation to be detected is executed in the execution unit when the operation data received from the information processing device generating the operation data matches the operation pattern, and notifying of execution of the operation to be detected.

BRIEF DESCRIPTION OF THE DRAWINGS

Exemplary features and advantages of the present invention will become apparent from the following detailed description when taken with the accompanying drawings in which:

FIG. 5 is a diagram illustrating an example of a user attribute definition 133 according to the first exemplary embodiment of the present invention;

FIG. 6 is a diagram illustrating an example of generating a bit string of an operation group 142 according to the first exemplary embodiment of the present invention;

FIG. 9 is a diagram illustrating another example of generating a bit string of the operation group 142 according to the first exemplary embodiment of the present invention;

FIG. 11 is a diagram illustrating an example of generating a bit string of an operation group 142 according to a second exemplary embodiment of the present invention;

EXEMPLARY EMBODIMENT

First Exemplary Embodiment

A first exemplary embodiment of the present invention is described.

First, a configuration of the first exemplary embodiment of the present invention is described.

Figure 2:
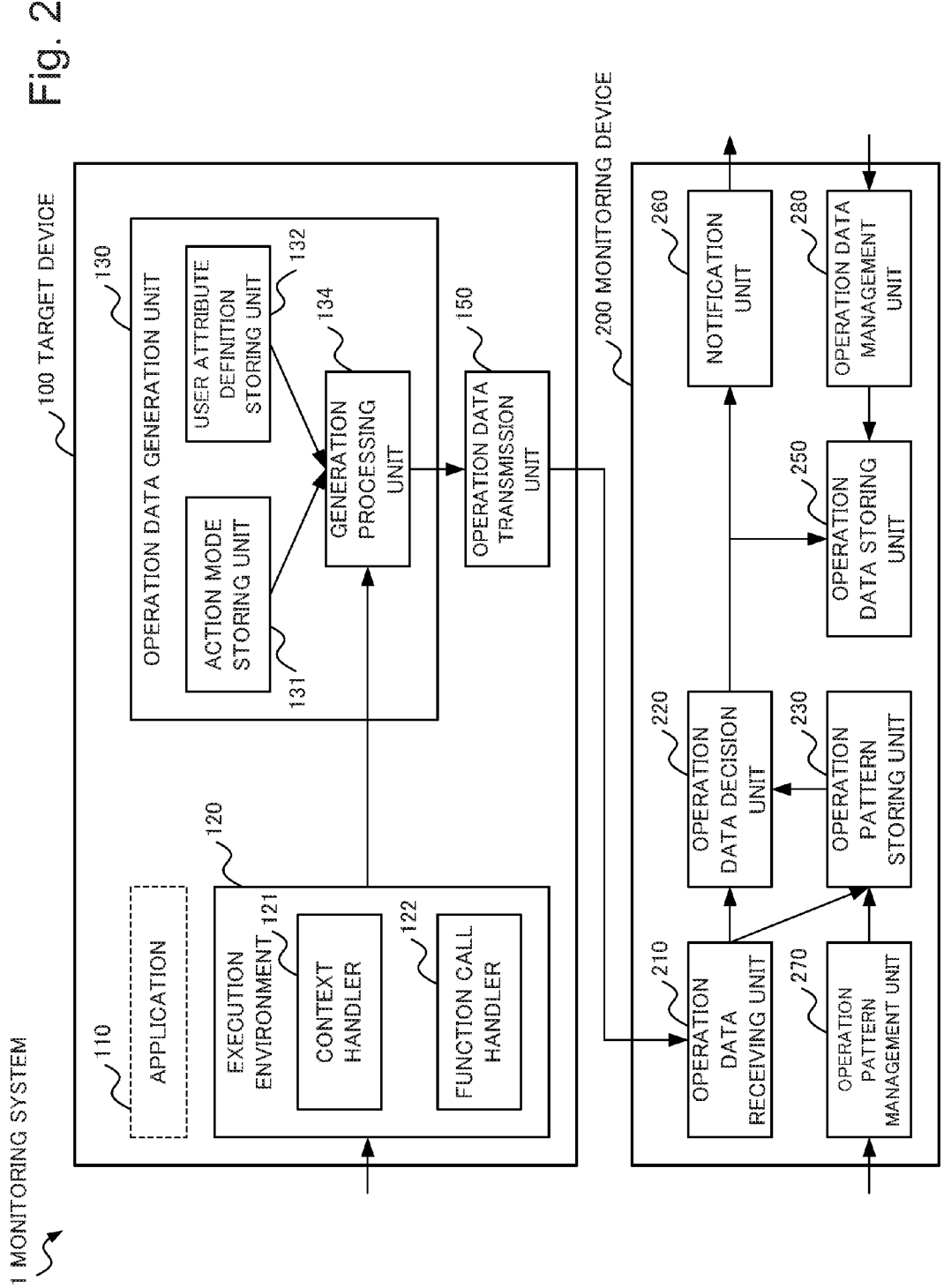
FIG. 2 is a block diagram illustrating a configuration of a monitoring system 1 according to the first exemplary embodiment of the present invention.

FIG. 2 is a block diagram illustrating a configuration of a monitoring system 1 according to the first exemplary embodiment of the present invention.

Referring to FIG. 2, the monitoring system 1 includes one or more target devices 100 and a monitoring device 200 that monitors the target devices 100. The target device 100 is connected to the monitoring device 200 through a network or the like. The monitoring system 1 is an exemplary embodiment of an information processing system according to the present invention. Further, the target device 100 is an exemplary embodiment of an information processing device according to the present invention.

In the target device 100, an IT (Information Technology) system for providing a service to a user is constructed.

Each of the target device 100 and the monitoring device 200 may be a computer that includes a CPU (Central Processing Unit) and a storage medium storing a program and operates under control based on the program. Further, each of the target device 100 and the monitoring device 200 may be a virtual machine arranged on a computer.

Further, each of the target device 100 and the monitoring device 200 is managed and operated by different administrators or the like, such as a user and a provider of a cloud-based service. In the exemplary embodiment of the present invention, an administrator or the like for the target device 100 is called a system administrator.

The target device 100 includes an execution environment 120, an operation data generation unit 130, and an operation data transmission unit 150.

The execution environment 120 is a program arranged on a computer. The execution environment 120 reads one or more executable application programs (applications 110) to configure a system, and executes the application programs. The execution environment 120 may include a library to be provided to the applications 110.

The execution environment 120 executes the application 110 in response to a request from a client (not depicted) and responds an execution result to the client. A predetermined service is provided to a user by repeating a request and a response between the client and the execution environment 120 once or more.

For example, when the system is a Web system including a Java (registered trademark)-based Web application server (Web AP server) and a browser, the Web AP server and the browser correspond to the execution environment 120 and the client, respectively. When a user utilizes a service of the Web system, the browser is connected to the Web AP server and performs user authentication. Then, in response to a user's instruction or the like, an HTTP (Hyper Text Transfer Protocol) request and a response are repeated between the client and the Web AP server.

The execution environment 120 includes a context handler 121 and a function call handler 122.

The context handler 121 is, for example, a journaling function providing unit and extracts a session with the client (from a user's login to the user's logout through the client). Further, the context handler 121 extracts an authority level of a user utilizing the client.

The function call handler 122 is, for example, a profiler function providing unit and detects a function name for each function call in the application 110 on the execution environment 120. For example, in the case of a Java language, a combination of a class name (FQCN (Fully Qualified Class Name)) and a method name (Method) is used as the function name.

The operation data generation unit 130 generates operation data 140 based on the session, the authority level of a user, which are extracted by the context handler 121, and the function name detected by the function call handler 122.

Figure 7:
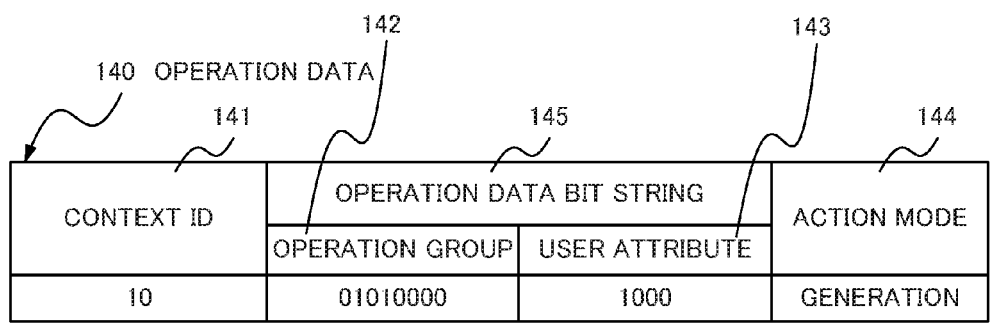
FIG. 7 is a diagram illustrating an example of operation data 140 according to the first exemplary embodiment of the present invention.

FIG. 7 is a diagram illustrating an example of operation data 140 according to the first exemplary embodiment of the present invention.

The operation data 140 include a context identifier (context ID) 141, an operation group 142, a user attribute 143, and an action mode 144.

The context ID 141 is an identifier for identifying operation data 140.

The operation group 142 indicates a set of operations executed during a session by the client in a system to be monitored. In the first exemplary embodiment of the present invention, a function name which is extracted by the function call handler 122 and called in the application 110, is used as an operation to be set in the operation group 142. In the operation group 142, a bit string representing a set of function names by a Bloom Filter is set.

Note that, as long as an operation executed by the client can be indicated, for example, other types of information, such as a telegram transmitted and received to and from the client and a telegram transmitted and received between programs on the system, can be used as an operation to be set in the operation group 142.

The user attribute 143 indicates an authority level of a user. In the first exemplary embodiment of the present invention, a bit string corresponding to an authority level defined by a user attribute definition 133 described below is set in the user attribute 143.

Hereinafter, a bit string obtained by adding a bit string of the user attribute 143 to a bit string of the operation group 142, as illustrated in FIG. 7, is referred to as an operation data bit string 145.

The action mode 144 indicates whether the operation data 140 generated by the operation data generation unit 130 is operation data 140 for monitoring (the action mode 144: "monitoring") or operation data 140 for generating an operation pattern 240 (the action mode 144: "generation").

The operation data generation unit 130 includes an action mode storing unit 131, a user attribute definition storing unit 132, and a generation processing unit 134.

The action mode storing unit 131 stores the action mode 144. The action mode 144 is set by a system administrator.

The user attribute definition storing unit 132 stores the user attribute definition 133. The user attribute definition 133 indicates correspondence between an authority level of a user and a bit string representing the authority level.

FIG. 5 is a diagram illustrating an example of the user attribute definition 133 according to the first exemplary embodiment of the present invention. In the example illustrated in FIG. 5, in the user attribute definition 133, any one of four bits is assigned to each authority level. Note that a role of a user in the system, such as an administrative user and a general user, may be used, instead of the authority level.

The generation processing unit 134 numbers the context ID 141 for each session extracted by the context handler 121.

Further, the generation processing unit 134 generates a bit string (operation bit string) by the Bloom Filter corresponding to each function name extracted by the function call handler 122 during a session. Then, upon termination of the session, the generation processing unit 134 generates a bit string of the operation group 142 by calculating a logical sum of operation bit strings corresponding to the respective function names.

FIG. 6 is a diagram illustrating an example of generating a bit string of the operation group 142 according to the first exemplary embodiment of the present invention.

The generation processing unit 134 calculates a bit position corresponding to a function name using a predetermined hash function, and generates an operation bit string in which 1 is set at the calculated bit position, and 0 is set at the remaining bit positions. Assuming that a length of the operation bit string is m, the hash function returns values sufficiently dispersed between 1 and m.

In the example illustrated in FIG. 6, bit positions "2" and "4" are calculated corresponding to function names "CUSTOMER DATA. LIST-RETRIEVE ( )" and "PRINT SCREEN ( )", respectively. Thus, operation bit strings "01000000" and "00010000" are generated.

Note that the generation processing unit 134 may calculate a plurality of bit positions using a plurality of hash functions for a same function name, and may set 1 at the calculated plurality of bit positions. Further, in this case, the generation processing unit 134 may calculate a plurality of bit positions in parallel.

Then, the generation processing unit 134 generates a bit string of the operation group 142 by calculating a logical sum of operation bit strings corresponding to the generated respective function names.

In the example illustrated in FIG. 6, the operation group 142 "01010000" is calculated as a logical sum of operation bit strings "01000000" and "00010000".

Further, the generation processing unit 134 generates the user attribute 143 by extracting a bit string corresponding to an authority level of a user from the user attribute definition 133.

The operation data transmission unit 150 transmits, to the monitoring device 200, the operation data 140 generated by the operation data generation unit 130.

The monitoring device 200 includes an operation data receiving unit 210, an operation data decision unit 220, an operation pattern storing unit 230, an operation data storing unit 250, a notification unit 260, an operation pattern management unit 270, and an operation data management unit 280.

The operation data receiving unit 210 receives the operation data 140 from the target device 100.

The operation pattern storing unit 230 stores the operation pattern 240 representing a set of operations to be detected.

Figure 8:
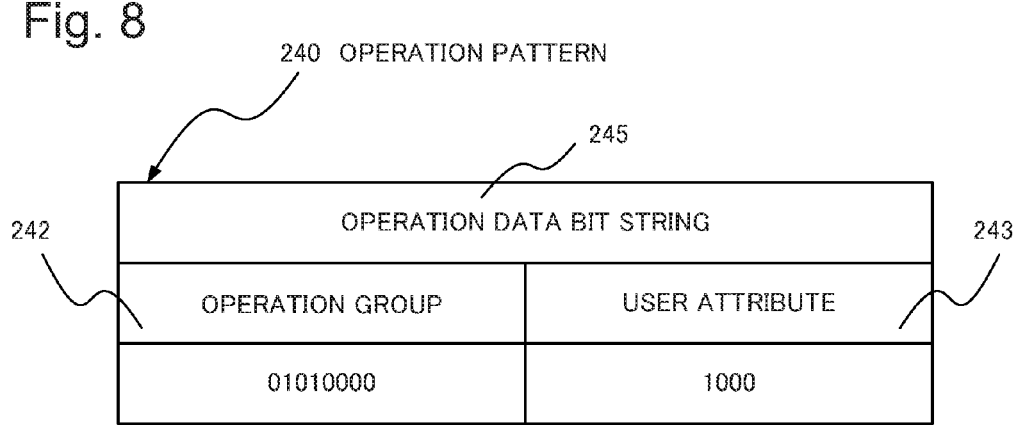
FIG. 8 is a diagram illustrating an example of an operation pattern 240 according to the first exemplary embodiment of the present invention.

FIG. 8 is a diagram illustrating an example of the operation pattern 240 according to the first exemplary embodiment of the present invention.

The operation pattern 240 includes an operation group 242 and a user attribute 243.

In the operation group 242 and the user attribute 243, the operation group 142 and the user attribute 143 included in the operation data 140, which is received from the target device 100, and the action mode 144 of which is "generation".

Note that the operation pattern 240 may be set by a system administrator through the operation pattern management unit 270. In this case, the system administrator may set, based on information concerning function names of the system, an operation group 242 not generated in a normal operation of the system. For example, the system administrator may define operations of retrieving, referring, and updating for important information of the system, such as commodity master data, customer data, and transaction data, and operations relating to transfer of money, such as receiving money, paying money, accepting an order, and placing an order.

Hereinafter, as illustrated in FIG. 8, a bit string obtained by adding a bit string of the user attribute 243 to a bit string of the operation group 242 is referred to as an operation data bit string 245.

The operation data decision unit 220 monitors the operation data 140, the action mode 144 of which is "monitoring". The operation data decision unit 220 extracts, among operation patterns 240 stored in the operation pattern storing unit 230, an operation pattern 240 having an operation data bit string 245 matching the operation data bit string 145 of the operation data 140. When there is an operation pattern 240 matching the operation data 140, the operation data decision unit 220 decides that "an operation to be detected is executed" in the target device, and notifies of the decision result through the notification unit 260.

The operation data storing unit 250 stores the operation data 140 received from the target device 100 together with the decision result. The operation data storing unit 250 may store either all of the received operation data 140 or only the operation data 140 to be notified of.

The notification unit 260 notifies (outputs to) another device, such as a terminal of a system administrator of the target device 100, of the decision result made by the operation data decision unit 220. Note that the notification unit 260 may notify of the decision result, together with the operation data 140 and other pieces of information included in the operation data 140.

The operation pattern management unit 270 provides, for a terminal or the like of a system administrator, an interface for retrieving, adding, referring, updating, deleting, and the like for the operation pattern 240 in the operation pattern storing unit 230.

The operation data management unit 280 provides, for a terminal or the like of a system administrator, an interface for retrieving, adding, referring, updating, deleting, and the like for the operation data 140 in the operation data storing unit 250.

Note that each of the target device 100 and the monitoring device 200 may be a computer which includes a CPU (Central Processing Unit) and a storage medium storing a program and which operates under control based on the program. Further, the operation data generation unit 130 may be arranged in a device which is administrated and operated by a system administrator and differs from the target device 100.

The operation pattern storing unit 230 and the operation data storing unit 250 in the monitoring device 200 may be configured as either individual storage media or a single storage medium. Further, the operation pattern storing unit 230 and the operation data storing unit 250 may be arranged in other devices connected to the monitoring device 200 through a network or the like, respectively. Furthermore, the operation pattern storing unit 230 and the operation data storing unit 250 may be arranged in a cluster configuration on a plurality of computers, respectively.

Next, an operation of the first exemplary embodiment of the present invention is described.

The operation is described using, as an example, a case of detecting execution of two operations "list-retrieving customer data" and "printing" in a same session by a user whose authority level is "1". It is assumed that a user whose authority level is "1" is permitted to retrieve and display customer data, and that, however, when the user executes both of the operations in a certain session, detection and a notification (warning) of such a situation, from a viewpoint of management of personal information, are needed.

Further, it is assumed that the user attribute definition 133 illustrated in FIG. 5 is stored in the user attribute definition storing unit 132.

First, an operation pattern generation process according to the first exemplary embodiment of the present invention is described.

The operation pattern generation process is executed in a case that a system administrator sets "generation" in the action mode 144. In this case, the system administrator accesses the execution environment 120 from the client at an authority level of a user to be detected, and performs an operation to be detected.

Figure 3:
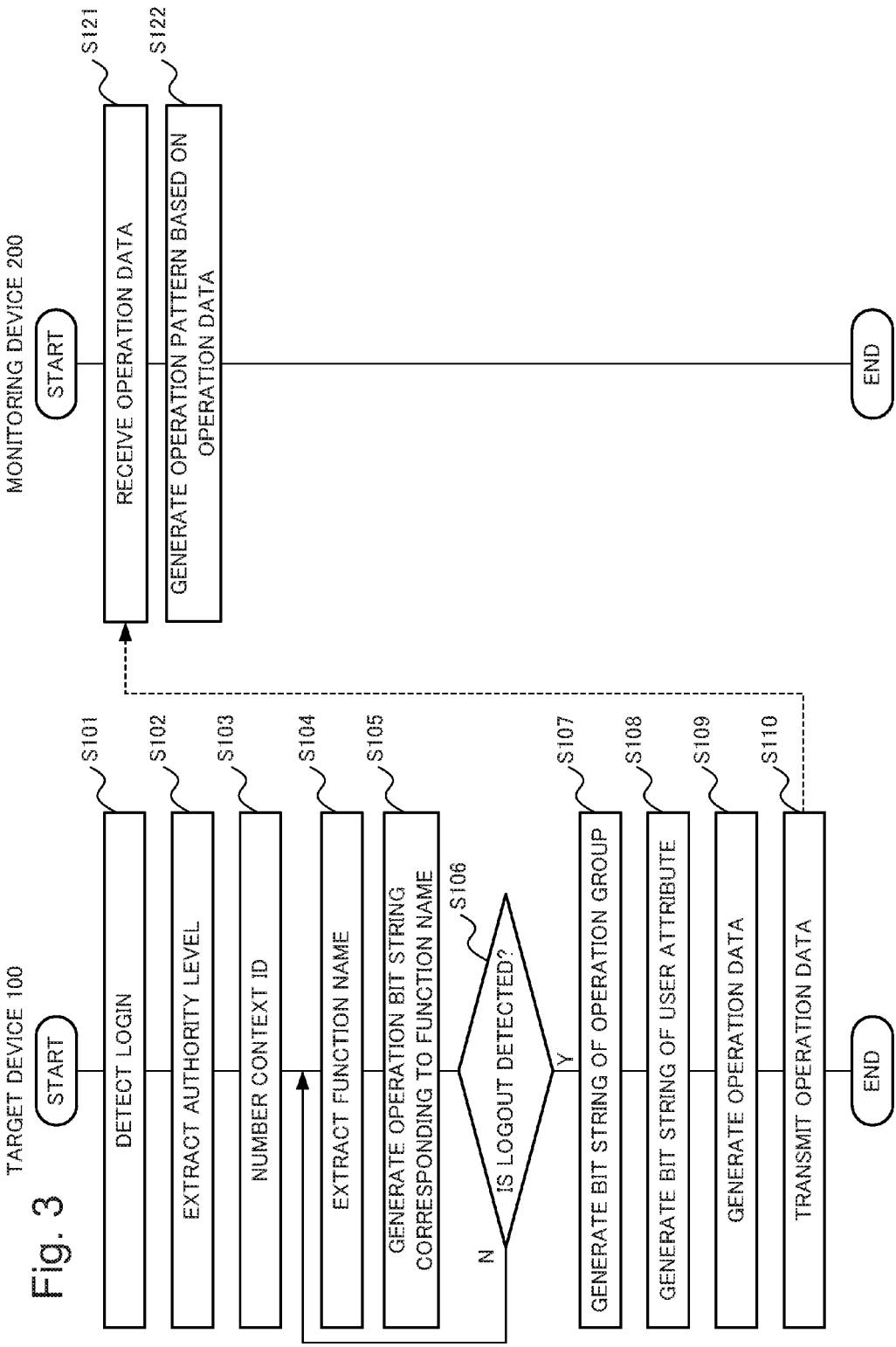
FIG. 3 is a flowchart illustrating an operation pattern generation process according to the first exemplary embodiment of the present invention.

FIG. 3 is a flowchart illustrating the operation pattern generation process according to the first exemplary embodiment of the present invention.

When detecting a user's login (step S101), the context handler 121 of the execution environment 120 in the target device 100 extracts an authority level of the user (step S102).

For example, the context handler 121 extracts an authority level "1" of the user.

The generation processing unit 134 of the operation data generation unit 130 numbers a context ID 141 (step S103).

For example, the generation processing unit 134 numbers a context ID 141 "10".

The function call handler 122 extracts a function name for each function call corresponding to a user's operation in the application 110 (step S104).

The generation processing unit 134 generates a bit string (operation bit string) by a Bloom Filter corresponding to the function name (step S105).

Then, steps S104 and S105 are repeated until the context handler 121 detects the user's logout (step S106).

For example, as illustrated in FIG. 6, the generation processing unit 134 generates operation bit strings "01000000" and "00010000" corresponding to function names "CUSTOMER DATA. LIST-RETRIEVE ( )" and "PRINT SCREEN ( )" extracted for respective two operations "list-retrieving customer data" and "printing" performed by the user.

When the context handler 121 detects the user's logout (Y in step S106), the generation processing unit 134 generates a bit string of the operation group 142 by calculating a logical sum of the operation bit strings (step S107).

For example, as illustrated in FIG. 6, the generation processing unit 134 calculates the operation group 142 "01010000".

The generation processing unit 134 extracts, from the user attribute definition 133, a bit string corresponding to an authority level of the user and generates a bit string of the user attribute 143 (step S108).

For example, the generation processing unit 134 generates, based on the user attribute definition 133 illustrated in FIG. 5, a user attribute 143 "1000" which corresponds to the authority level "1" of the user.

The generation processing unit 134 generates the operation data 140, based on the context ID 141, the operation group 142, the user attribute 143, and the action mode 144 (step S109).

For example, as illustrated in FIG. 7, the generation processing unit 134 generates operation data 140 in which a context ID 141 "10", an operation group 142 "01010000", a user attribute 143 "1000", and an action mode 144 "generation" are set.

The operation data transmission unit 150 transmits, to the monitoring device 200, the operation data 140 generated by the operation data generation unit 130 (step S110).

For example, the operation data transmission unit 150 transmits, to the monitoring device 200, the operation data 140 illustrated in FIG. 7.

The operation data receiving unit 210 of the monitoring device 200 receives the operation data 140 from the target device 100 (step S121). Since the action mode 144 of the operation data 140 is "generation", the operation data receiving unit 210 generates, based on the operation data 140, an operation pattern 240 in which an operation group 242 and a user attribute 243 are set, and causes the operation pattern storing unit 230 to store the generated operation pattern 240 (step S122).

For example, the operation data receiving unit 210 generates, based on the operation data 140 illustrated in FIG. 7, an operation pattern 240 in which an operation group 242 "01010000" and a user attribute 243 "1000" are set, as illustrated in FIG. 8.

Next, a monitoring process according to the first exemplary embodiment of the present invention is described.

It is assumed that the operation pattern 240 illustrated in FIG. 8 is stored in the operation pattern storing unit 230.

An operation pattern generation process is executed in a case that a system administrator sets the action mode 144 as "monitoring". In this case, a user accesses the execution environment 120 from the client and performs an operation for utilizing a service.

Figure 4:
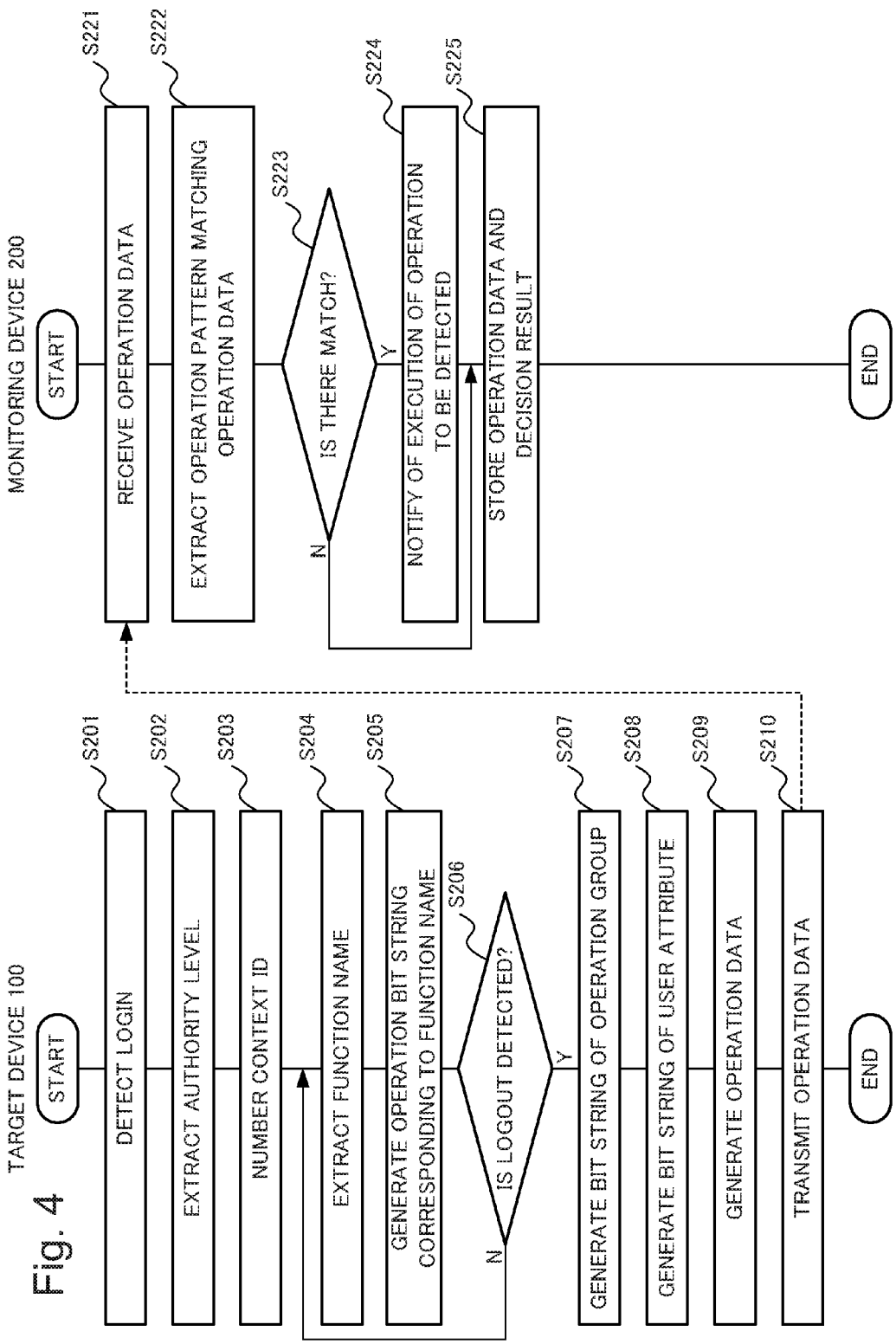
FIG. 4 is a flowchart illustrating a monitoring process according to the first exemplary embodiment of the present invention.

FIG. 4 is a flowchart illustrating the monitoring process according to the first exemplary embodiment of the present invention.

An operation performed from the time when the context handler 121 detects a user's login until the operation data transmission unit 150 transmits the operation data 140 (steps S201 to S210) is similar to the above operation pattern generation process (steps S101 to S110).

For example, when detecting a user's login, the context handler 121 extracts an authority level "1" of the user. Further, the generation processing unit 134 numbers a context ID 141 as "30".

FIG. 9 is a diagram illustrating another example of generating a bit string of the operation group 142 according to the first exemplary embodiment of the present invention.

As illustrated in FIG. 9, the generation processing unit 134 generates operation bit strings "00100000", "00000010", "00000001", "10000000", "01000000", "00010000", and "00001000", corresponding to function names "LOGIN", "NEW CUSTOMER DATA. CREATE ( )", "CUSTOMER DATA. RETRIEVE ( )", "CUSTOMER DATA. CORRECT ( )", "CUSTOMER DATA. LIST-RETRIEVE ( )", "PRINT SCREEN ( )", and "LOGOUT" extracted for a user's operations, respectively.

When the context handler 121 detects a user's logout, the generation processing unit 134 calculates an operation group 142 "11111011", which is a logical sum of the operation bit strings, as illustrated in FIG. 9. Further, the generation processing unit 134 generates a user attribute 143 "1000", which corresponds to an authority level "1" of a user, based on the user attribute definition 133 illustrated in FIG. 5.

Figure 10:
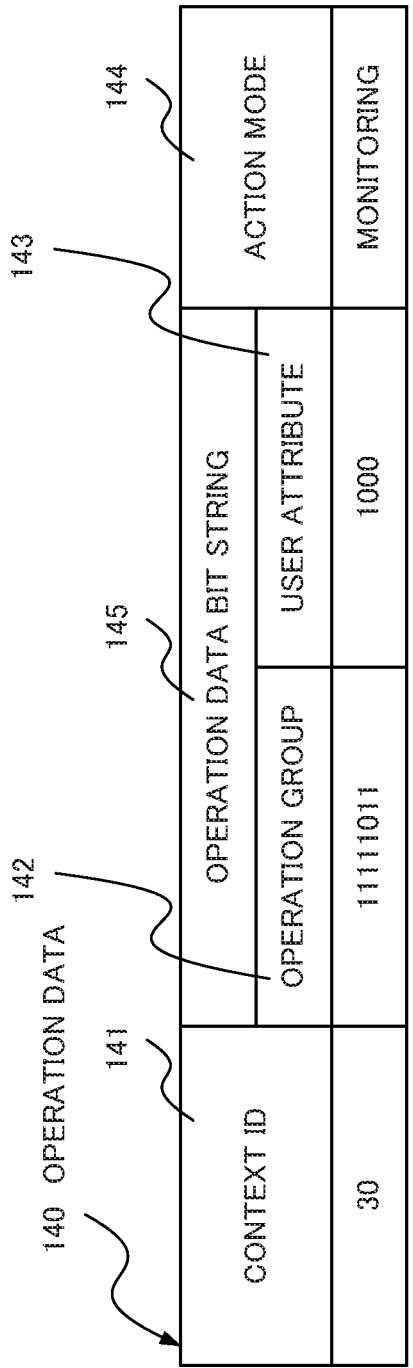
FIG. 10 is a diagram illustrating another example of the operation data 140 according to the first exemplary embodiment of the present invention.

FIG. 10 is a diagram illustrating another example of the operation data 140 according to the first exemplary embodiment of the present invention.

As illustrated in FIG. 10, the generation processing unit 134 generates operation data 140 in which a context ID 141 "30", an operation group 142 "11111011", a user attribute 143 "1000", and an action mode 144 "monitoring" are set.

Then, the operation data transmission unit 150 transmits, to the monitoring device 200, the operation data 140 illustrated in FIG. 10.

Next, the operation data receiving unit 210 of the monitoring device 200 receives the operation data 140 from the target device 100 (step S221). Since the action mode 144 of the operation data 140 is "monitoring", the operation data receiving unit 210 transfers the operation data 140 to the operation data decision unit 220. The operation data decision unit 220 extracts, among operation patterns 240 stored in the operation pattern storing unit 230, an operation pattern 240 having an operation data bit string 245 which matches the operation data bit string 145 of the received operation data 140 (step S222).

In the first exemplary embodiment of the present invention, the operation data decision unit 220 extracts an operation pattern 240 having an operation data bit string 245 which has a perfect match with the operation data bit string 145. The expression "perfect match" means that, 1 is set at respective bit positions in the operation data bit string 145 which correspond to all bit positions at which 1 is set in the operation data bit string 245. That is, the expression "perfect match" means that the operation group 142 includes all operations of the operation group 242.

The operation data decision unit 220 calculates a logical product (degree of coincidence) of the operation data bit string 145 and the operation data bit string 245. Then, the operation data decision unit 220 calculates an exclusive-OR of the calculated logical product (degree of coincidence) and the operation data bit string 245. Thus, the operation data decision unit 220 detects a perfect match between the operation data bit strings 145 and 245.

For example, the operation data decision unit 220 calculates a logical product "010100001000" of the operation data bit string 145 "111110111000" of the operation data 140 illustrated in FIG. 10 and the operation data bit string 245 "010100001000" of the operation pattern 240 illustrated in FIG. 8. Then, since an exclusive-OR of the logical product "010100001000" and the operation data bit string 245 "010100001000" is "000000000000," the operation data decision unit 220 decides that the operation data bit string 145 perfectly matches the operation data bit string 245.

When the matched operation pattern 240 is detected in a step S222 (Y in step S223), the operation data decision unit 220 decides that "an operation to be detected in the target device 100 is executed", and notifies of the decision result via the notification unit 260 (step S224). The notification unit 260 notifies a system administrator's terminal of "execution of an operation to be detected", together with the context ID 141 of the operation data 140.

For example, the notification unit 260 notifies of "execution of an operation to be detected", together with a context ID 141 "30."

Thus, the monitoring device 200 can detect "execution of retrieving and displaying customer data in a same session by a user whose authority level is "1"", without analyzing contents represented by the operation data bit string 145 in the operation data 140.

The operation data decision unit 220 causes the operation data storing unit 250 to store the operation data 140 and the decision result (step S225).

For example, the operation data decision unit 220 causes the operation data storing unit 250 to store the operation data 140 illustrated in FIG. 10 and a decision result of "execution of an operation to be detected".

In the above process, an operation of the first exemplary embodiment of the present invention is completed.

Next, a characteristic configuration of the first exemplary embodiment of the present invention will be described.

Figure 1:
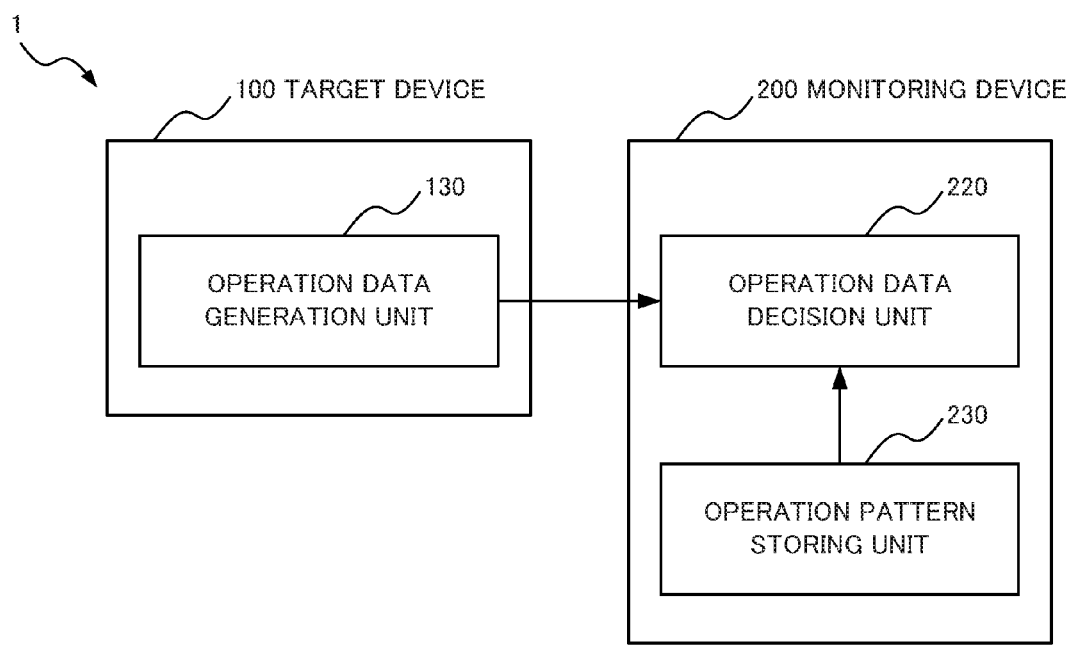
FIG. 1 is a block diagram illustrating a characteristic configuration of a first exemplary embodiment of the present invention.

FIG. 1 is a block diagram illustrating a characteristic configuration of the first exemplary embodiment of the present invention.

Referring to FIG. 1, a monitoring system 1 (an information processing system) includes a target device 100 (a first device) and a monitoring device 200 (a second device).

The target device 100 includes an operation data generation unit 130. The operation data generation unit 130 generates operation data 140 as data of encoding a set of operations related to a predetermined program executed in an execution environment 120, and transmits the operation data to the monitoring device 200.

The monitoring device 200 includes an operation pattern storing unit 230 and an operation data decision unit 220. The operation pattern storing unit 230 stores an operation pattern

240 as operation data related to a set of operations to be detected. The operation data decision unit 220 decides that the operation to be detected is executed in the execution unit when the operation data received from the target device 100 matches the operation pattern 240, and notifies of execution of the operation to be detected.

Next, advantageous effects of the first exemplary embodiment of the present invention are described.

According to the technologies described in the above Japanese Patent Application Laid-Open No. 2010-108469, and the above document entitled "IBM InfoSphere Guardium Data Security", a monitoring device analyzes contents of an operation, based on information collected from a system to be monitored, and detects illegal and/or abnormal operations. In this case, in order to analyze contents of an operation, the monitoring device needs to know detailed information on the system to be monitored, such as a structure and logic of an application running on the system to be monitored, and a type and a structure of data processed by the application.

Meanwhile, an application running on a system to be monitored, and a monitoring service of the system may be provided by different organizations, respectively. For example, in a case that a system to be monitored is built on a PaaS (Platform as a Service) type of cloud service, an application running on the system is provided by a user of the cloud service, while a monitoring service of the system is provided by a provider of the cloud service.

In the case of using the technologies described in the above Japanese Patent Application Laid-Open No. 2010-108469, and the above document entitled "IBM InfoSphere Guardium Data Security", a user of the cloud service needs to present, to a provider of the cloud service, detailed information concerning the above system including confidential information. In addition, the provider of the cloud service faces a risk of leakage of confidential information held by the user of the cloud service to a third party.

According to the first exemplary embodiment of the present invention, the monitoring device can detect illegal and/or abnormal operations in a system to be monitored without using detailed information concerning the system.

The reason is that the operation data generation unit 130 of the target device 100 generates the operation data 140 which are data obtained by encoding a set of operations executed in the execution environment 120, and that, in a case that the operation data 140 received from the target device 100 matches the operation pattern 240 which is operation data concerning a set of operations to be detected, the operation data decision unit 220 of the monitoring device 200 decides that an operation to be detected is executed in the execution environment 120.

Consequently, the monitoring device 200 can detect execution of an operation to be monitored without analyzing contents of the operation data 140. Thus, the monitoring device 200 does not need detailed information concerning a system to be monitored for analyzing contents of an operation, such as a structure and logic of an application running on the system to be monitored, and a type and a structure of data processed by the application.

Accordingly, even in a case that an application running on a system to be monitored, and a service of monitoring the system are provided by different organizations, respectively, a provider of the application does not need to present detailed information concerning the system to a provider of the monitoring service. In addition, the provider of the monitoring service does not face a risk of leakage of confidential information held by the provider of the application.

Further, according to the first exemplary embodiment of the present invention, an amount of data, which are collected by the monitoring device from the target device in detecting illegal and/or abnormal operations in the target device, can be reduced.

The reason is that data acquired by the operation data decision unit 220 from the monitoring device 200 is data obtained by encoding a set of operations, and that thus, in comparison with a case of acquiring function names representing operations or the like, an amount of data can considerably be reduced.

According to the first exemplary embodiment of the present invention, illegal and/or abnormal operations in the target device can be detected at high speed.

The reason is that a set of operations are represented by a Bloom Filter in the operation data 140 and the operation pattern 240, and that the monitoring device 200 detects a match between the operation data 140 and the operation pattern 240 by performing logical operations of the Bloom Filter between the operation data 140 and the operation pattern 240.

Further, according to the first exemplary embodiment of the present invention, illegal and/or abnormal operations can be detected without changing a system and an application to be monitored.

The reason is that the execution environment 120 performs detection of a session, and detection of a function name to be called, which are needed for generating the operation data 140.

Further, according to the first exemplary embodiment of the present invention, illegal and/or abnormal operations, which do not occur in a normal operation of the system, can be detected. The reason is that the operation pattern 240 defined by a system administrator can be set in the operation pattern storing unit 230 through the operation pattern management unit 270.

Second Exemplary Embodiment

Next, a second exemplary embodiment of the present invention is described.

In a second exemplary embodiment of the present invention, whether the notification unit 260 performs a notification is decided using a score calculated based on a weight 244 and a degree of coincidence of an operation pattern 240, whose match with operation data 140 is detected. In this respect, the second exemplary embodiment of the present invention differs from the first exemplary embodiment of the present invention.

Figure 12:
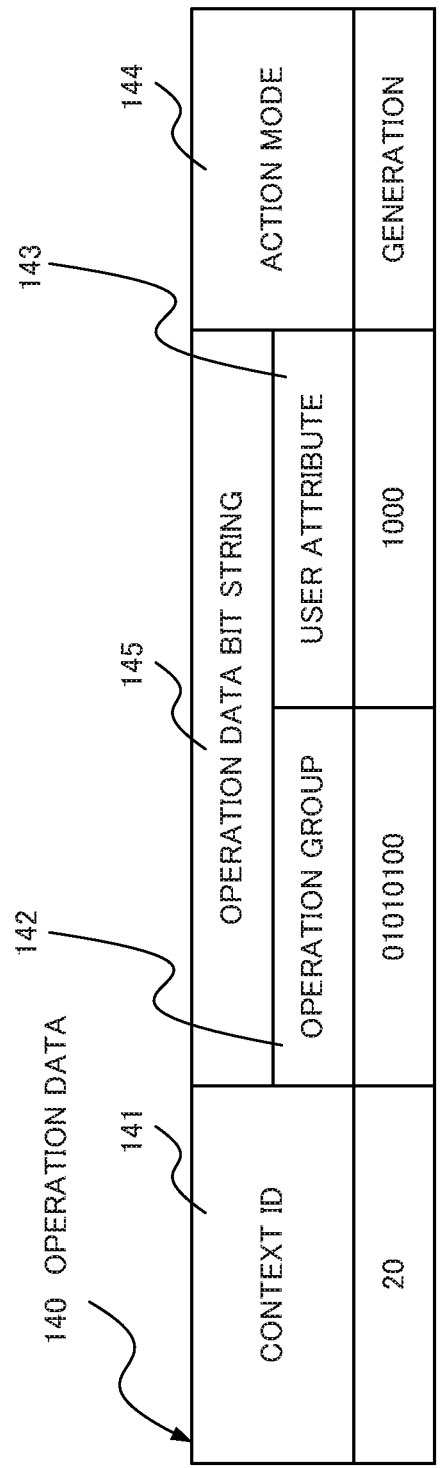
FIG. 12 is a diagram illustrating an example of operation data 140 according to the second exemplary embodiment of the present invention.

FIGS. 11 and 12 are diagrams illustrating an example of generating a bit string of an operation group 142 and an example of operation data 140, in the second exemplary embodiment, respectively. The operation data 140 illustrated in FIG. 12 is generated for the operation group 142 illustrated in FIG. 11.

In the example of generating a bit string illustrated in FIG. 11, a function name "ACCEPTED ORDER DATA. LIST-RETRIEVE ( )" is added to the function names in the example illustrated in FIG. 6. Consequently, the operation group 142 "01010100" is set in the operation data 140 illustrated in FIG. 12.

Figure 13:
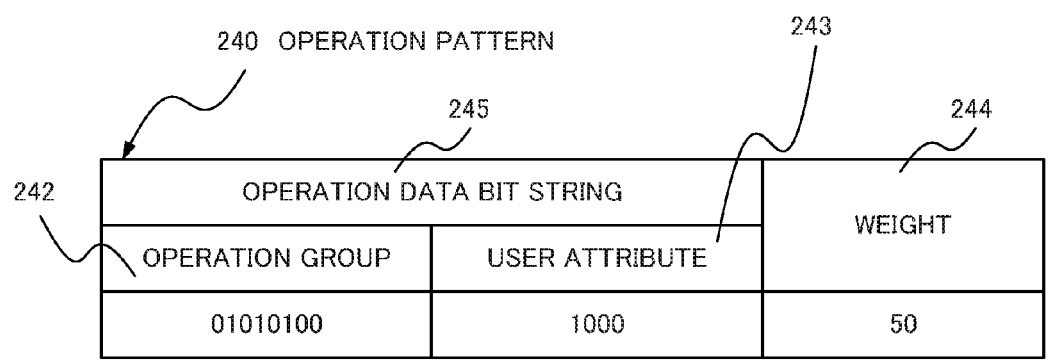
FIG. 13 is a diagram illustrating an example of an operation pattern 240 according to the second exemplary embodiment of the present invention.

FIG. 13 is a diagram illustrating an example of an operation pattern 240 according to the second exemplary embodiment of the present invention. The operation pattern 240 illustrated in FIG. 13 is generated based on the operation data 140 illustrated in FIG. 12.

In the second exemplary embodiment of the present invention, the operation pattern 240 includes a weight 244 in addition to an operation group 242 and a user attribute 243.

The weight 244 indicates a degree of importance (degree of risk) of the operation pattern 240. The weight 244 is set by a system administrator through an operation pattern management unit 270.

An operation data decision unit 220 calculates a score, based on a degree of coincidence between an operation data bit string 145 and an operation data bit string 245, and the weight 244. The operation data decision unit 220 decides, based on the calculated score, whether to notify of "execution of an operation to be detected".

Next, an operation pattern generation process according to the second exemplary embodiment of the present invention is described.

It is assumed that the operation data 140 illustrated in FIG. 12 is generated and transmitted from the target device 100 to the monitoring device 200.

When the operation group 242 and the user attribute 243 of the operation pattern 240 are set based on the operation data 140 in the above step S122, the operation pattern management unit 270 receives a weight 244 input from a system administrator. Then, the operation pattern management unit 270 sets the input weight 244 in the operation pattern 240.

For example, as illustrated in FIG. 13, the operation pattern management unit 270 sets a weight 244 "50" in the operation pattern 240 generated based on the operation data 140 illustrated in FIG. 12.

Next, a monitoring process according to the second exemplary embodiment of the present invention is described.

It is assumed that the operation pattern 240 illustrated in FIG. 13 is stored in the operation pattern storing unit 230.

In the above step S222, the operation data decision unit 220 detects, among operation patterns 240 stored in the operation pattern storing unit 230, an operation pattern 240 having an operation data bit string 245 which has a partial match with an operation data bit string 145 of the received operation data 140, in addition to an operation pattern 240 having an operation data bit string 245 which has a perfect match with the operation data bit string 145 of the received operation data 140.

The expression "partial match" means that, 1 is set at respective bit positions in the operation data bit string 145 which correspond to a part of bit positions at which 1 is set in the operation data bit string 245. That is, the expression "partial match" means that the operation group 142 includes a part of operations represented by the operation group 242.

Then, the operation data decision unit 220 calculates a score, using a logical product (degree of coincidence) of the operation data bit string 145 and the operation data bit string 245, and the weight 244. When the calculated score is equal to or greater than a notification decision reference score, the operation data decision unit 220 decides to notify of "execution of an operation to be detected".

For example, the operation data decision unit 220 calculates a logical product "010100001000" of the operation data bit string 145 "111110111000" of the operation data 140 illustrated in FIG. 10 and the operation data bit string 245 "010101001000" of the operation pattern 240 illustrated in FIG. 13. Then, since an exclusive-OR of the logical product "010100001000" and the operation data bit string 245 "010101001000" is "000001000000", the operation data decision unit 220 decides that the operation data bit string 145 has a partial match with the operation data bit string 245.

Then, the operation data decision unit 220 calculates a score "32.5" obtained by multiplying a ratio "0.75" of the number of 1s "3" in the logical product "010100001000" to the number of 1s "4" in the operation data bit string 245 "010101001000" by the weight 244 "50".

In a case that the notification decision reference score is "40", the operation data decision unit 220 decides not to notify of "execution of an operation to be detected".

The operation data decision unit 220 causes an operation data storing unit 250 to store the operation data 140 illustrated in FIG. 10 and a decision result "the score: 32.5, and no notification".

Note that the operation pattern management unit 270 may adjust the weight 244 in accordance with a request from a system administrator. For example, the system administrator may refer to operation data 140 stored in the operation data storing unit 250 and may increase, when a degree of risk of the operation data 140 being less than and close to the notification decision reference score is high, the weight 244 of the operation pattern 240 having a match (perfect or partial match) with the operation data 140 so as to make the operation data 140 a notification target. Conversely, the system administrator may decrease, when a degree of risk of the operation data 140 being equal to or greater than and close to the notification decision reference score is low, the weight 244 of the operation pattern 240 having a match (perfect or partial match) with the operation data 140 so as to prevent the operation data 140 from being a notification target.

Further, the system administrator may refer to operation data 140 stored in the operation data storing unit 250, generate a new operation pattern 240, based on the operation data 140 being less than and close to the notification decision reference score, and set the new operation pattern 240 in the operation pattern storing unit 230.

In the above process, an operation of the second exemplary embodiment of the present invention is completed.

Next, advantageous effects of the second exemplary embodiment of the present invention are described.

According to the second exemplary embodiment of the present invention, presence or absence of a notification can be controlled depending on a degree of importance of the operation pattern 240 which the operation data 140 matches.

The reason is that the operation data decision unit 220 decides whether to perform a notification, using a score calculated based on the weight 244 and a degree of coincidence of the operation pattern 240 detected as matching the operation data 140.

Further, according to the second exemplary embodiment of the present invention, contents of a notification can be narrowed down so that a notification concerning an operation having a low degree of risk is reduced, and only a notification concerning an operation having a high degree of risk is performed. The reason is that a system administrator can adjust the weight 244 through the operation pattern management unit 270.

Furthermore, according to the second exemplary embodiment of the present invention, illegal and/or abnormal operations can be detected while such operations have a small effect on the system. The reason is that a system administrator can add a new operation pattern 240 through the operation pattern management unit 270.

Third Exemplary Embodiment

Next, a third exemplary embodiment of the present invention is described.

The third exemplary embodiment of the present invention differs from the second exemplary embodiment in deciding presence or absence of a notification, using scores calculated for a plurality of operation patterns 240.

Figure 14:
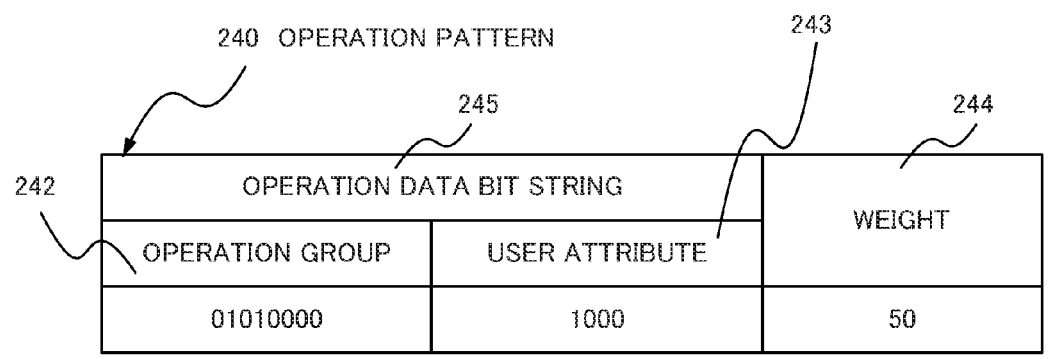
FIG. 14 is a diagram illustrating an example of an operation pattern 240 according to a third exemplary embodiment of the present invention.

FIG. 14 is a diagram illustrating an example of the operation pattern 240 according to the third exemplary embodiment of the present invention. The operation pattern 240 illustrated in FIG. 14 is generated based on the operation data 140 illustrated in FIG. 7.

An operation pattern generation process according to the third exemplary embodiment of the present invention is similar to that according to the second exemplary embodiment of the present invention.

For example, as illustrated in FIG. 14, the operation pattern management unit 270 sets a weight 244 "50" in the operation pattern 240 generated based on the operation data 140 illustrated in FIG. 7.

Next, a monitoring process according to the third exemplary embodiment of the present invention is described.

It is assumed that the operation patterns 240 illustrated in FIGS. 13 and 14 are stored in the operation pattern storing unit 230.

In the above step S222, the operation data decision unit 220 calculates a score for each operation pattern 240 having a perfect or partial match with the received operation data 140, and decides, when an average score is equal to or greater than the notification decision reference score, to notify of "execution of an operation to be detected".

For example, the operation data decision unit 220 calculates a logical product "010100001000" of the operation data bit string 145 "111110111000" of the operation data 140 illustrated in FIG. 10 and the operation data bit string 245 "010100001000" of the operation pattern 240 illustrated in FIG. 14. Then, since an exclusive-OR of the logical product "010100001000" and the operation data bit string 245 "010100001000" is "000000000000", the operation data decision unit 220 decides that the operation data bit string 145 has a perfect match with the operation data bit string 245.

Then, the operation data decision unit 220 calculates a score "50" by multiplying a ratio "1.0" of the number of 1s "3" in the logical product "010100001000" to the number of 1s "3" in the operation data bit string 245 "010100001000" by the weight 244 "50".

Further, the operation data decision unit 220 calculates a logical product "010100001000" of the operation bit string 145 "111110111000" of the operation data 140 illustrated in FIG. 10 and the operation data bit string 245 "010101001000" of the operation pattern 240 illustrated in FIG. 13. Then, since an exclusive-OR of the logical product "010100001000" and the operation data bit string 245 "010101001000" is "000001000000", the operation data decision unit 220 decides that the operation data bit string 145 has a partial match with the operation data bit string 245.

Then, the operation data decision unit 220 calculates a score "32.5" by multiplying a ratio "0.75" of the number of 1s "3" in the logical product "010100001000" to the number of 1s "4" in the operation data bit string 245 "010101001000" by the weight 244 "50".

Further, the operation data decision unit 220 calculates an average "41.25" of these scores.

When the notification decision reference score is "40", it is decided to notify of "execution of an operation to be detected".

The notification unit 260 notifies of "execution of an operation to be detected", together with the context ID 141 "30".

The operation data decision unit 220 causes the operation data storing unit 250 to store the operation data 140 illustrated in FIG. 10 and a decision result "the score: 41.25, and there is a notification".

In the above process, an operation of the third exemplary embodiment of the present invention is completed.

According to the third exemplary embodiment of the present invention, presence or absence of a notification can be comprehensively decided using a plurality of operation patterns 240, as compared with the second exemplary embodiment. The reason is that the operation data decision unit 220 uses scores calculated for a plurality of respective operation patterns 240 to decide whether to perform a notification.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in the exemplary embodiments of the present invention, a set of operations within a session are encoded using a Bloom Filter in the operation data 140 and the operation pattern 240. However, other encoding methods may be used, as long as a set of operations can be represented thereby.

Further, a Bloom Filter included in the operation data bit strings of the operation data 140 and the operation pattern 240 may be a hierarchical Bloom Filter having a tree structure as described in Wakabayashi et al., "Bloom Filters Based on the B-Tree", Information Processing Society of Japan Technical Report, Multimedia Communication and Distributed Processing Workshop Report, 2008 (117), General Incorporated Association Information Processing Society, Nov. 20, 2008, pp. 43-48. In this case, the operation data decision unit 220 may retrieve an operation group and a user attribute separately.

Further, a bit string of the user attribute may be omitted in the operation data bit strings of the operation data 140 and the operation pattern 240. Consequently, definition of the operation pattern 240 by a system administrator can be simplified. Thus, a processing time for generating the operation data 140 in the target device 100 can be reduced. Further, an amount of data of the operation data 140 received by the monitoring device 200 can be reduced, thereby a time required to perform a decision process in the operation data decision unit 220 can also be shortened.

Further, when one monitoring device 200 monitors a plurality of systems operated by a plurality of different organizations (tenants), the operation data bit string may include a bit string for identifying a tenant. Accordingly, the monitoring device 200 can collectively detect illegal and/or abnormal operations in a plurality of tenant systems.

Further, the operation pattern 240 may include a notification option for selecting each of decision methods in the operation data decision unit 220, which have been described in the first to third exemplary embodiments. In this case, in accordance with a notification option included in an operation pattern 240 matching the operation data 140, the operation data decision unit 220 selects one of the following decision methods: for example, performing a notification when the operation data 140 has a perfect match with the operation pattern 240; performing a notification decision based on a score for each operation pattern 240; and performing a notification decision based on an average of scores for a plurality of respective operations patterns 240.

Further, the bit strings of the operation groups of the operation data 140 and the operation pattern 240 may be a Counting Filter. The Counting Filter is obtained by setting, at each bit position in a Bloom Filter, a counter indicating the number of times of occurrence of an operation corresponding to the bit position. When the operation data 140 is compared with the operation pattern 240, the operation data decision unit 220 compares values of the counters at respective bit positions, or calculates scores using values of the counters at respective bit positions. Consequently, the number of times of occurrence of a specific operation in a session can be set as a condition for performing a notification decision. Therefore, for example, a large number of times of execution of a printing operation can be detected as an operation relating to taking out confidential data.

Further, a weight may be given to each bit position in a bit string of the operation group 242, instead of giving the weight 244 to the operation pattern 240. In this case, a weight is given to each bit position, at which 1 is set, in the bit string of the operation group 242. The operation data decision unit 220 calculates a score by obtaining a sum of weights at the respective bit positions, at each of which 1 is set, in the logical product of the operation data bit string 145 and the operation data bit string 245.

Thus, since an operation pattern 240 in which a weight is set at each bit position is configured only by the operation data bit string 245, such an operation pattern 240 is suitable for a case of using the above hierarchical Bloom Filter having a tree structure.

Further, a plurality of operation patterns 240 in each of which a weight is set at each bit position may be integrated into one operation pattern 240 by calculating a logical sum of the data bit strings 245 of the plurality of operation patterns 240. Consequently, an amount of data in the operation pattern storing unit 230 can be reduced, and a load on the decision process performed by the operation data decision unit 220 can also be reduced.

Further, according to the exemplary embodiments of the present invention, the weight 244 is set by a system administrator or the like through the operation pattern management unit 270. However, the operation data generation unit 130 of the target device 100 may decide a weight based on an authority level of a user or the like in the above operation pattern generation process and give the weight to the operation data 140. In this case, the operation data receiving unit 210 of the monitoring device 200 sets the weight given to the operation data 140 as the weight 244 in the operation pattern 240.

Further, the operation data bit strings of the operation data 140 and the operation pattern 240 may include other data, such as parameters relating to the system, in addition to the Bloom Filter. In this case, the operation data decision unit 220 of the monitoring device 200 may perform a decision process also using the other data.

The invention claimed is:

1. A monitoring method comprising:
receiving, in a second device, operation data indicating a set of instructions executed in a program in a first device, from the first device;
determining, in the second device, an operation is executed by the program in the first device when the operation data matches a pattern data indicating a set of instructions to be detected; and
outputting, from the second device, a notification indicating the determination.

2. The monitoring method according to claim 1, wherein the set of instructions includes function calls.

3. The monitoring method according to claim 1, wherein the operation data is obtained by encoding the set of instructions executed in the program.

4. The monitoring method according to claim 3, wherein the operation data includes an array of bits indicating the set of instructions executed in the program.

5. The monitoring method according to claim 3, wherein the operation data includes an array of bits represented by a Bloom Filter representing the set of instructions executed in the program.

6. The monitoring method according to claim 1, wherein the pattern data is obtained by encoding the set of instructions to be detected.

7. The monitoring method according to claim 6, wherein the pattern data includes an array of bits indicating the set of instructions to be detected.

8. The monitoring method according to claim 6, wherein the pattern data includes an array of bits represented by a Bloom Filter representing the set of instructions to be detected.

9. The monitoring method according to claim 1, wherein, in the outputting, a result of the determination is outputted to a device.

10. The monitoring method according to claim 1, wherein, in the outputting, a result of the determination is outputted to an operator device.

11. A monitoring method comprising:
obtaining operation data indicating a set of instructions executed in a program in a first device; and
sending the operation data to a second device which determines an operation is executed by the program in the first device when the operation data matches a pattern data indicating a set of instructions to be detected and outputs a notification indicating the determination.

12. The monitoring method according to claim 11, wherein the set of instructions includes function calls.

13. The monitoring method according to claim 11, wherein the operation data is obtained by encoding the set of instructions executed in the program.

14. The monitoring method according to claim 13, wherein the operation data includes an array of bits indicating the set of instructions executed in the program.

15. The monitoring method according to claim 13, wherein the operation data includes an array of bits represented by a Bloom Filter representing the set of instructions executed in the program.

16. The monitoring method according to claim 11, wherein the pattern data is obtained by encoding the set of instructions to be detected.

17. The monitoring method according to claim 16, wherein the pattern data includes an array of bits indicating the set of instructions to be detected.

18. The monitoring method according to claim 16, wherein the pattern data includes an array of bits represented by a Bloom Filter representing the set of instructions to be detected.

19. The monitoring method according to claim 11, wherein the second device outputs a result of the determination to a device.

20. The monitoring method according to claim 11, wherein the second device outputs a result of the determination to an operator device.

21. A monitoring method comprising:
obtaining an operation data indicating a set of instructions executed in a program in a first device;

transmitting the operation data from the first device to a second device;

determining, in the second device, an operation is executed by the program in the first device when the operation data matches a pattern data indicating a set of instructions to be detected; and outputting, from the second device, a notification indicating the determination.

22. The monitoring method according to claim 21, wherein the set of instructions includes function calls.

23. The monitoring method according to claim 21, wherein the operation data is obtained by encoding the set of instructions executed in the program.

24. The monitoring method according to claim 23, wherein the operation data includes an array of bits indicating the set of instructions executed in the program.

25. The monitoring method according to claim 23, wherein the operation data includes an array of bits represented by a Bloom Filter representing the set of instructions executed in the program.

26. The monitoring method according to claim 21, wherein the pattern data is obtained by encoding the set of instructions to be detected.

27. The monitoring method according to claim 26, wherein the pattern data includes an array of bits indicating the set of instructions to be detected.

28. The monitoring method according to claim 26, wherein the pattern data includes an array of bits represented by a Bloom Filter representing the set of instructions to be detected.

29. The monitoring method according to claim 21, wherein, in the outputting, a result of the determination is outputted to a device.

30. The monitoring method according to claim 21, wherein, in the outputting, a result of the determination is outputted to an operator device.

* * * * *